United States Patent [19]

Arena et al.

[11] 4,052,327
[45] Oct. 4, 1977

[54] COMPOSITIONS FOR ERADICATING ELECTROPHOTOGRAPHIC IMAGES FROM TRANSLUCENT PAPER

[75] Inventors: Ronald D. Arena, Durham; Eric G. Lowry, Middletown, both of Conn.

[73] Assignee: Addressograph Multigraph Corporation, Cleveland, Ohio

[21] Appl. No.: 599,719

[22] Filed: July 28, 1975

Related U.S. Application Data

[63] Continuation-in-part of Ser. No. 431,391, Jan. 7, 1974, abandoned.

[51] Int. Cl.² .................. C11D 7/02; C11D 3/16; C11D 3/43
[52] U.S. Cl. .................. 252/141; 134/40; 252/153; 252/162; 252/170; 252/171; 252/364; 252/541; 252/544; 252/549; 252/DIG. 4; 252/DIG. 14
[58] Field of Search ............... 252/171, 541, 544, 170, 252/DIG. 14, 141, 364, DIG. 4, 153, 162, 549; 15/1.5; 134/40

[56] References Cited

U.S. PATENT DOCUMENTS

| | | | |
|---|---|---|---|
| 3,527,708 | 9/1970 | Clark et al. | 252/170 |
| 3,645,048 | 2/1972 | MacClaren | 51/281 |
| 3,728,268 | 4/1973 | Burt | 252/170 |
| 3,772,205 | 11/1973 | Dongas | 252/171 |
| 3,784,477 | 1/1974 | Esposito | 252/171 X |
| 3,813,342 | 5/1974 | Cooperman | 252/170 |

FOREIGN PATENT DOCUMENTS

| | | | |
|---|---|---|---|
| 549,129 | 11/1957 | Canada | 252/DIG. 4 |
| 69-2965 | 2/1969 | Japan | |

OTHER PUBLICATIONS

Chemical Abstracts, vol. 70, 1969, p. 282, col. 2 under 96191g.

*Primary Examiner*—Thomas J. Herbert, Jr.
*Attorney, Agent, or Firm*—Michael A. Kondzella

[57] ABSTRACT

Compositions useful for eradicating images which have been produced upon paper by electrophotographic or similar means are provided. Suitable formulations include an alcohol having 1 to 3 carbon atoms or a nitrile having 2 to 3 carbon atoms and are derived from a solvent formulating map prepared from a plot of hydrogen bonding indices against solubility parameters. In general such formulations include a mixture of solvents and may include a ketone or ester in addition to such alcohol or nitrile.

4 Claims, 1 Drawing Figure

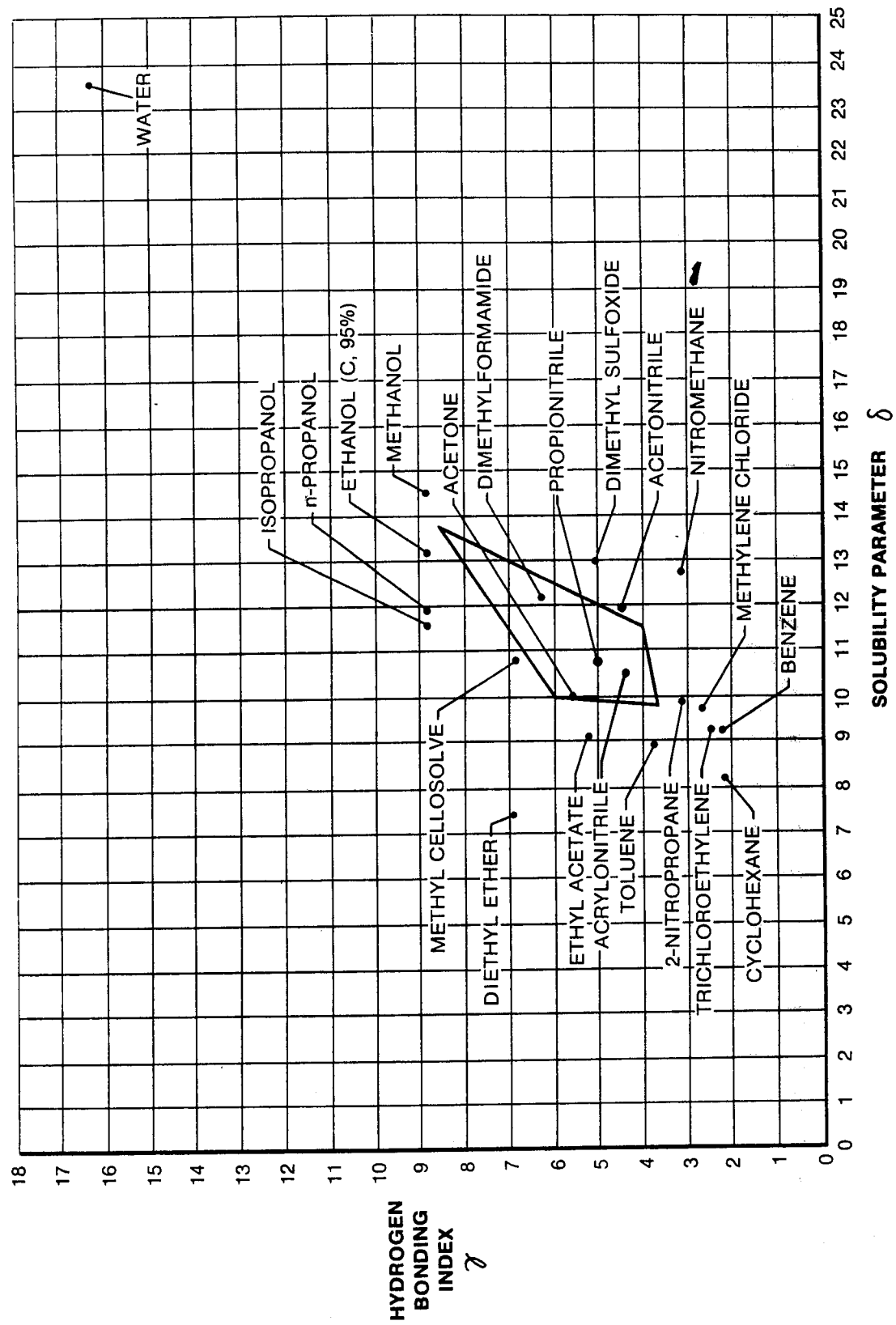

COMPOSITIONS FOR ERADICATING ELECTROPHOTOGRAPHIC IMAGES FROM TRANSLUCENT PAPER

RELATED APPLICATION

This is a continuation-in-part of copending application Ser. No. 431,391, filed Jan. 7, 1974 now abandoned.

BACKGROUND OF THE INVENTION

The use of translucent tracing paper such as vellum for the preparation of engineering drawings is well known. Translucent electrophotographic copies are of special interest since they are useful as diazo intermediates and once corrected are inexpensive second originals. Correction of such drawings, however, entails erasing the undesired areas with standard type abrasive erasers which results in the smudging of the toner which has been fixed to the vellum during the course of preparation of the copy and the removal of part of the surface of the tracing paper. This is particularly undesirable where, following erasure, it is desired to correct the drawing by the use of pencil or ink.

Various efforts have been made to provide means for erasing toned images from electrophotographically produced copies. U.S. Pat. No. 3,645,048 to Robert H. MacClaren, for instance, describes an eraser composition suitable for the removal of electrophotographic images which comprises an abrasive material uniformly distributed throughout a wax binder. However, these efforts have been only partially successful.

OBJECTS

It is an object of this invention to provide a composition useful in eradicating electrophotographic images from translucent paper so that corrections and copies can be easily made.

Another object of this invention is to provide low cost eradicator compositions which are effective to erase electrophotographic images from translucent paper speedily.

Another object of this invention is to provide eradicator compositions which can be used without damaging the paper from which the image is eradicated.

Other objects and advantages of this invention will become apparent in the course of the following detailed disclosure and description.

BRIEF DESCRIPTION OF THE INVENTION

This invention provides eradicator compositions which are comprised of mixtures of organic solvents. These mixtures contain at least one alcohol having from 1 to 3 carbon atoms or a nitrile having from 2 to 3 carbon atoms. The solvents to be used generally contain a ketone or ester having up to 4 carbon atoms in addition to the alcohol or nitrile but may contain a variety of other types of solvents as well. Suitable formulations are selected by means of a solvent formulating map prepared from a plot of "Hydrogen Bonding Index" against "Solubility Parameter" for a variety of solvents.

The "Solubility Parameter", $\delta$, is related to the free energy change on mixing a solvent and solute and is determined from the energy of vaporization per unit volume which is a measure of the internal pressure or cohesive energy density. It is defined as the square root of the cohesive energy density and is given by the expression:

$$\delta = \sqrt{\Delta E/V}$$

where $\Delta E$ is the energy of vaporization and $V$ is the ratio of the molecular weight of the substance being considered to its density in grams per cubic centimeter.

The likelihood of solution occurring is dependent upon how close are the $\beta$ values of solute and solvent. Although the values of $\beta$ can be calculated precisely from heats of vaporization, it is more usual to use values which have been tabulated. For example, the tabulation of H. Burrell is frequently used, Burrell, H., OFFIC. DIG. FED. SOC. PAINT TECHNOL. 27, 726–758 (1955). Other published values are available and are frequently provided in trade bulletins of suppliers of solvents.

The "Hydrogen Bonding Index", $\gamma$, is another parameter which is utilized to predict solubility. A spectroscopic method developed by Gordy compares the absorption frequency of the OD-band of deuterated methanol in an aprotic reference solvent with the absorption frequency of the OD-band in the presence of the test solvent. The shift in absorption frequency caused by the test solvent is taken as a measure of its hydrogen bonding strength. Gordy, W., J. CHEM. PHYS. 7, 93–99 (1939); Gordy, W. & Stanford, S.C., J. CHEM. PHYS. 8, 170–177 (1949); Gordy, W. & Stanford, S.C., J. CHEM. PHYS. 9, 204–214 (1941). The numerical values are obtained by applying an empirical correction factor to the frequency shift given in wave numbers.

The Hydrogen Bonding Index for each solvent of interest is plotted against the Solubility Parameter for that solvent and a scatter plot results. Solvents and solvent mixtures having a variety of hydrogen bonding indices and solubility parameters are then used to attempt to eradicate images. In this manner a range of hydrogen bonding indices and solubility parameters is arrived at and determines an area upon the plot of Hydrogen Bonding Index against Solubility Parameter in which the solvent compositions are effective to eradicate an image without adversely affecting the surface of the paper or hampering the ability to correct the drawing or other image and to produce satisfactory copies of the corrected drawing.

The plot obtained in this manner, although similar to solvent formulating maps used in formulating various synthetic resins is different in that the plot provides a range of solvent formulations which are effective not only to eradicate electrophotographic images from vellum and other translucent paper but also to do so without damaging the surface of the paper, thus enabling the paper which has been treated with eradicator to be remarked or redrawn upon so that copies of the corrected drawing or other image can be conveniently reproduced.

BRIEF DESCRIPTION OF THE DRAWING

The figure is a solubility map prepared by plotting the Hydrogen Bonding Index, $\gamma$, against the Solubility Parameter, $\delta$, of various solvents and solvent mixtures.

DESCRIPTION OF THE PREFERRED EMBODIMENTS

It has now been found that compositions, the coordinates of which lie within the quadrangle defined by the Cartesian coordinates (9.8, 3.7), (10.0, 6.0), (13.7, 8.5), and (11.5, 4.0), where the abscissae are the solubility parameters and the ordinates, are the hydrogen bonding indices of various solvents, are effective to eradicate electrophotographic images from paper, especially translucent paper, particularly that used in the preparation of engineering drawings such as vellum. Although only a few single solvents have solubility parameter and hydrogen bonding index coordinates lying within the quadrangle defined by the above coordinates, a variety of mixtures of solvents having the desired coordinates can be formulated using constituents which either fall within the quadrangle or outside the boundaries thereof. In determining whether a solvent mixture will be effective for eradicating electrophotographic images, the values for the solubility parameter and the hydrogen bonding index of the mixture are determined by means of the following relationships:

$$\delta_M = \delta_1 V_1 + \delta_2 V_2 + \ldots \delta_i V_i$$

$$\gamma_M = \gamma_1 V_1 + \gamma_2 V_2 + \ldots \gamma_i V_i$$

where $\delta_1$, $\delta_2$, etc. are individual solubility parameters of the respective solvents 1, 2, etc. constituting the solvent mixture and $\gamma_1$, $\gamma_2$, etc. are individual hydrogen bonding indices of the solvents. $V_1$, $V_2$, etc. are volume fractions of the solvents components.

The single solvents which have solubility parameters and hydrogen bonding indices lying within the quadrangle include dimethylformamide, acrylonitrile, propionitrile and acetone. However, dimethylformamide is very slow evaporating and for that reason tends to give eradication which is somewhat messy. Propionitrile and acrylonitrile are quite toxic and have objectionable odors. Acetone by itself gives fair results with, however, a mild amount of smudging. Mixtures containing these solvents can nevertheless be utilized since some of the disadvantages of the pure solvents are overcome by using appropriate mixtures as described below.

Solvent mixtures which are useful in this invention may be exemplified by mixtures of the solvents shown in the figure. However, these solvents are merely exemplary the solvents which can be used and many other solvents can be similarly utilized.

The solvents included in the figure and their solubility parameters, $\delta$, and hydrogen bonding indices, $\delta$, are listed in Table 1. The listing of solvents in Burrell, H., OFFIC. DIG. FED. SOC. PAINT TECHNOL. 27, 726–758 (1955) and similar listings provide a wider selection of solvents. However, the list of solvents included in the figure will suffice for purposes of illustration. The values shown in Table 1 and plotted in the drawing are taken from "Solvent Formulating Maps for ELVACITE Acrylic Resins" (A-70562) E.I. DuPont DeNemours & Co., Electrochemicals Dept., July, 1970. It should be appreciated that values tabulated by different investigators may differ slightly.

The method used for eradicating images from tracing paper using the eradicators of this invention consists of saturating a suitable applicator such as a cotton swab or other absorbent pad with the solvent or solvent mixture to be used and rubbing the applicator containing the solvent over the area to be eradicated.

In addition to the solvent mixtures selected from within the quadrangle on the solvent map as described above, certain additives may be desirable for use with the solvent. These additives include film forming polymers, transparentizing oils or resins, inorganic pigments and wetting agents. A

TABLE 1

| Solvent | Solubility Parameter $\delta$ | Hydrogen Bonding Index $\gamma$ |
|---|---|---|
| ACETONE | 10.0 | 5.7 |
| ACETONITRILE | 11.9 | 4.5 |
| ACRYLONITRILE | 10.5 | 4.3 |
| BENZENE | 9.2 | 2.2 |
| CYCLOHEXANE | 8.2 | 2.2 |
| DIETHYL ETHER | 7.4 | 6.9 |
| DIMETHYLFORMAMIDE | 12.1 | 6.4 |
| DIMETHYL SULFOXIDE | 13.0 | 5.0 |
| ETHANOL (C, 95%) | 13.1 | 8.9 |
| ETHYL ACETATE | 9.1 | 5.2 |
| ISOPROPANOL | 11.5 | 8.9 |
| METHANOL | 14.5 | 8.9 |
| METHYL CELLOSOLVE | 10.8 | 6.9 |
| METHYLENE CHLORIDE | 9.7 | 2.7 |
| NITROMETHANE | 12.7 | 3.1 |
| 2-NITROPROPANE | 9.9 | 3.1 |
| n-PROPANOL | 11.9 | 8.9 |
| PROPIONITRILE | 10.8 | 5.0 |
| TOLUENE | 8.9 | 3.8 |
| TRICHLOROETHYLENE | 9.3 | 2.5 |
| WATER | 23.5 | 16.2 | variety of each of these materials are commercially available and any suitable material may be used for this purpose.

The advantages of the formulations of this invention reside principally in the improved speed and low cost of these eradicators and the good archival performance of eradicated and subsequently corrected drawings prepared using them.

This invention will be better understood by reference to the following examples which are intended to illustrate but not unnecessarily limit except as defined in the claims appended hereto.

In the following examples the concentrations of ingredients are expressed in parts by volume unless otherwise noted.

EXAMPLE 1

A mixture of 50 parts ethanol ($\delta$13.1, $\gamma$ 8.9) and 50 parts trichloroethylene ($\delta$9.3, $\gamma$ 2.5) was prepared.

$$\delta_M = (0.5)(13.1) + (0.5)(9.3) = 11.2$$

$$\gamma_M = (0.5)(8.9) + (0.5)(2.5) = 5.7$$

A portion of a xerographic image produced using a Xerox Model 7000 on a sheet of translucent vellum was neatly eradicated using a clean cotton swab moistened with this composition, and excess solvent was allowed to evaporate. Ink lines were drawn over a portion of the eradicated area and were found to be of similar quality to those drawn in a non-eradicated area. When diazo copies are made (using the corrected xerographic copy as an intermediate) on a Bruning Copyflex Model 880, the diazo copies show no trace of the eradicated image and the redrawn lines were clearly legible.

EXAMPLE 2

Additional mixtures of trichloroethylene and ethanol were prepared as shown in Table 2. These solvents mixtures were appiled as in Example 1. The $\delta_M$ and $\gamma_M$ values and the results of eradication are also shown in Table 2. It can be seen that only those mixtues within the $\gamma_M$ and $\delta_M$ limits given in the test were satisfactory. Those outside the limits either smudged or did not eradicate the image.

TABLE 2

| FORMULATION NUMBER | 2A | 2B | 2C | 2D | 2E | 2F | 2G | 2H | 2I | 2J | 2K | 2L | 2M |
|---|---|---|---|---|---|---|---|---|---|---|---|---|---|
| Trichloroethylene parts by volume | 100 | 96 | 91 | 83 | 67 | 59 | 40 | 33 | 20 | 17 | 9 | 6 | 0 |
| Ethanol, parts by volume | 0 | 4 | 9 | 17 | 33 | 41 | 60 | 67 | 80 | 83 | 91 | 94 | 100 |
| Eradication | smudge | smudge | smudge | smudge | good | good | good | good | good | nil | nil | nil | nil |
| $\delta M$ | 9.3 | 9.5 | 9.6 | 9.9 | 10.6 | 10.9 | 11.6 | 11.8 | 12.3 | 12.5 | 12.8 | 12.9 | 13.1 |
| $\gamma M$ | 2.5 | 2.8 | 3.1 | 3.6 | 4.6 | 5.1 | 6.3 | 6.8 | 7.6 | 7.8 | 8.3 | 8.5 | 8.9 |

EXAMPLE 3

The following composition was applied as in Example 1, giving similar results.

| | Parts by Volume | |
|---|---|---|
| acetone | 18 | |
| water | 17 | $\delta_M = 13.4$ |
| ethanol | 35 | |
| methylene chloride | 25 | $\gamma_M = 8.2$ |
| isopropanol | 5 | |
| Total | 100 | |

EXAMPLE 4

The following composition was applied as in Example 1, giving similar results.

| | Parts by Volume | |
|---|---|---|
| cyclohexane | 33.3 | $\delta_M = 10.9$ |
| acetone | 33.3 | |
| methanol | 33.3 | $\gamma_M = 5.6$ |
| Total | 99.9 | |

EXAMPLE 5

The following composition was applied as in Example 1, giving similar results.

| | Parts by Volume | |
|---|---|---|
| benzene | 50 | $\delta_M = 11.2$ |
| ethanol | 50 | $\gamma_M = 5.6$ |
| Total | 100 | |

EXAMPLE 6

An electrophotographic copy of an original drawing was prepared using an Addressograph Multigraph Model 2000 Copier. A cotton pad moistened with the composition of Example 1 was used to eradicate the images from an area of about 4 square inches in about 20 seconds. Erasure of a similar area with a gritty eraser took about 10 minutes. Pencil lines were redrawn in the eradicated areas which were of comparable quality to the mechanically erased area. Subsequent copies were made on the above copier which do not show the eradicated lines but clearly show the redrawn lines.

EXAMPLE 7

An electrophotographic copy was prepared from a typed original using a Bruning Model 3000 Copier. The copy was corrected as in Example 6 except Formulation 2F shown in Table 2 was used and corrections were typed. Subsequent copies of the corrected sheet did not show the eradicated characters but the retyped characters were clearly shown.

EXAMPLE 8

The following composition was applied as in Example 1, giving similar results:

| | Parts by Volume | |
|---|---|---|
| acetone | 50 | $\delta_M = 11.0$ |
| acetonitrile | 50 | $\gamma_M = 5.1$ |

EXAMPLE 9

The following composition was applied as in Example 1, giving similar results:

| | Parts by Volume | |
|---|---|---|
| ethyl acetate | 50 | $\delta_M = 10.5$ |
| acetonitrile | 50 | $\gamma_M = 4.9$ |

This invention has been described with respect to a limited number of specific embodiments. However, it is intended that alternative compositions and methods can be used and it is to be understood that this invention is not to be limited except in accordance with the claims appended hereto.

We claim:

1. A composition for eradicating electrophotographic images from paper which comprises a solvent mixture, the Cartesian coordinates of which fall within the quadrangle bounded by the coordinates (9.8, 3.7), (10.0, 6.0) (13.7, 8.5) and (11.5, 4.0) on the Hydrogen Bonding Index ($\delta$) versus Solubility Parameter ($\delta$) plot of the drawing, said solvent mixture containing a nitrile having from 2 to 3 carbon atoms, and a solvent selected from the group consisting of ketones and esters having up to 4 carbon atoms.

2. A process for eradicating an electrophotographic image from paper comprising applying to the image to be eradicated a composition which comprises a solvent mixture, the Cartesian coordinates of which fall within the quadrangle bounded by the coordinates (9.8, 3.7), (1.0, 6.0), (13.7, 8.5), and (11.5, 4.0), on the Hydrogen Bonding Index ($\delta$) versus Solubility Parameter ($\gamma$) plot of the drawing, said solvent mixture containing a. a member selected from the group consisting of an aliphatic alcohol having from 1 to 3 carbon atoms and a nitrile having from 2 to 3 carbon atoms and
   b. at least one other solvent selected from the group consisting of
   acetone
   acetonitrile
   acrylonitrile
   benzene
   cyclohexane
   diethyl ether
   dimethylformamide
   dimethyl sulfoxide
   ethanol ethyl acetate
isopropanol
methanol
methyl cellosolve
methylene chloride
nitromethane
2-nitropropane
n-propanol
propionitrile
toluene
trichloroethylene and
water, the coordinates of which solvent mixture satisfy the relationship $$\delta_M = \delta_1 V_1 + \delta_2 V_2 + \ldots \delta_i V_i$$

$$\gamma_M = \delta_1 V_1 + \delta_2 V_2 + \ldots \delta_i V_i$$

where $\delta_1$, $\delta_2$, etc. are individual solubility parameters of the respective solvents 1, 2, etc. consituting the solvent mixture and $\gamma_1$, $\gamma_2$, etc. are individual hydrogen bonding indices of the solvents and $V_1$, $V_2$, etc. are volume fractions of the solvent components.

3. A process according to claim 2 wherein the paper is translucent.

4. A process according to claim 2 wherein said solvent mixture contains a nitrile and a solvent selected from the group consisting of ketones and esters having up to 4 carbon atoms.

* * * * *

UNITED STATES PATENT AND TRADEMARK OFFICE
CERTIFICATE OF CORRECTION

PATENT NO. : 4,052,327
DATED : October 4, 1977
INVENTOR(S) : Ronald Arena and Eric Lowry It is certified that error appears in the above-identified patent and that said Letters Patent are hereby corrected as shown below:

Column 2, line 5, "$\beta$" should be deleted and "$\delta$" substituted therefor; line 6, "$\beta$" should be deleted and "$\delta$" substituted therefor; line 24, "(1949)" should be deleted and "(1940)" substituted therefor.

Column 3, line 40, before the word "the" insert "of"; line 43, after the word "indices" delete "$\delta$" and substitute "$\gamma$".

Column 6, line 42, after the word "Parameter" delete "($\delta$)" and substitute "($\gamma$)"; line 52, before the number "6.0" delete "1.0" and substitute "10.0".

Signed and Sealed this

Twenty-fifth Day of April 1978

[SEAL]

Attest:

RUTH C. MASON
Attesting Officer

LUTRELLE F. PARKER
Acting Commissioner of Patents and Trademarks